April 14, 1970 HIDEYASU MAJIMA 3,506,837

PATTERN-DETECTING DEVICE USING SERIES CONNECTED PHOTOSENSITIVE BODIES

Filed Dec. 13, 1966 6 Sheets-Sheet 1

April 14, 1970 HIDEYASU MAJIMA 3,506,837

PATTERN-DETECTING DEVICE USING SERIES CONNECTED PHOTOSENSITIVE BODIES

Filed Dec. 13, 1966 6 Sheets-Sheet 4

United States Patent Office 3,506,837

Patented Apr. 14, 1970

3,506,837

PATTERN-DETECTING DEVICE USING SERIES CONNECTED PHOTOSENSITIVE BODIES

Hideyasu Majima, Kokubunji-shi, Tokyo-to, Japan, assignor to Hitachi, Ltd., Tokyo-to, Japan Filed Dec. 13, 1966, Ser. No. 601,409
Claims priority, application Japan, Dec. 15, 1965, 40/76,689; June 27, 1966, 41/41,369
Int. Cl. G06k *9/00*
U.S. Cl. 250—219 11 Claims

ABSTRACT OF THE DISCLOSURE

This application discloses a pattern detecting system and various photo-electric conversion elements which generally comprise a plurality of photo-sensitive bodies connected in series. The photo-sensitive bodies include solar batteries, photo-transistors, or photo-diodes and the like. The pattern-detecting system includes one photo-electric conversion element or two or more such elements connected in parallel in various combinations. The photo-electric elements are also provided with integrated construction.

This invention relates to a pattern detecting device and more particularly to a pattern detecting device for a high-speed character reading apparatus.

In a certain type of conventional character reading apparatus, a pattern detecting device comprising a plurality of photo-electric conversion elements is utilized. Such photo-electric conversion elements are generally arranged so as to form an image projecting plane, on which an optical image of a character to be read out is projected. These elements convert the optical image into electrical signals which include information pertaining to existence or non-existence of picture elements of such image at the predetermined positions. The sensitivity of such photo-electric conversion elements largely depends upon the ratio of light-current to dark-current thereof. (The term "light-current" refers to a current through the element at the time when a light is projected thereon, and the term "dark-current" refers to a current at the time when no light is projected.) The light-current tends to decrease when it is necessary to use elements of small size, or when it is required to detect a poorly illuminated image, such as an enlarged or a dark image. This decreased light-current causes the elements to incur a certain instability of operation. In such a special case as a high-speed character reading apparatus, it is necessary to use small load resistances, more poorly illuminated images and smaller size elements for detecting the images at a high response-speed. Consequently, the light-current tends to decrease more and more in such a case.

On the other hand, the dark-current of the photo-electric conversion elements normally exhibits a constant value in spite of the variation of the illumination value. For an example, a certain type of solar battery exhibits a dark-current of 3 $\mu$a./mm.$^2$ with a reverse bias-voltage of 6 volts applied thereto. In contrast to this, the light-current thereof is merely 5 $\mu$a./mm.$^2$ at an illumination value of 100 luxes, even if such battery is provided with a zero bias-voltage. Accordingly, the light-current of such battery used under the condition of a relatively low illumination value becomes substantially equal, to or slightly larger than the dark-current, independent of the value of the bias-voltage. Consequently, the ratio of signal to noise (S/N) becomes small, and then it become difficult to detect, without error, the existence or nonexistence of the image. Moreover, when a light is continuously projected onto the photo-electric conversion element, the operating temperature of such element is raised up to a relatively high value, and the dark-current is caused to exponentially increase. Consequently, the detection of the existence of the image becomes all the more difficult. Furthermore, it is difficult to achieve a large output signal because the use of a large valve of reverse bias-voltage or load resistance brings about unstable and inaccurate operation.

Accordingly, it is a main object of the present invention to provide a pattern detecting device, according to which such various disadvantages as mentioned above can be eliminated.

Another object of the present invention is to provide a pattern detecting device which exhibits an improved ratio of signal vs. noise (S/N).

Still another object of the present invention is to provide a pattern detecting device, according to which it is possible to remarkably decrease the dark-current of the photo-electric elements without decreasing the light-current thereof.

A further object of the present invention is to provide a pattern detecting device, according to which it is possible to maintain the dark-current of the photo-electric elements at a relatively small value even if a variation of operating temperature occurs.

A still further object of the present invention is to provide a pattern detecting device, according to which it is possible to generate with stability relatively large output signals.

An additional object of the present invention is to provide a pattern detecting device, according to which it is possible to use solar batteries, photo-transistors or photo-diodes which can quickly respond to light but have a relatively large dark-current.

In order to achieve the above mentioned objects, the pattern detecting device of the present invention is provided with photo-electric conversion elements which comprise a plurality of photo-sensitive bodies connected in series. When a dark image covers parts of the serially connected photo-sensitive bodies, the photo-electric conversion elements comprising such bodies can be positively cut off. Accordingly, it is possible to detect the pattern by arranging such a plurality of photo-electric conversion elements so as to form an image-projecting plane.

These and additional objects and advantages of the present invention will become more apparent from the following detailed description when taken in connection with the accompanying drawings, in which:

FIGURE 1 is a schematic diagram showing a functional flow chart of a conventional character reading apparatus;

FIGURES 2*a* and 2*b* are plan views showing two examples of partial photo-sensitive zones forming an image projecting plane of the pattern detecting device in FIGURE 1;

FIGURE 3*a* and 3*b* are plan views showing two possible modifications of the partial photo-sensitive zones of FIGURE 2;

Figures 6, 7A:
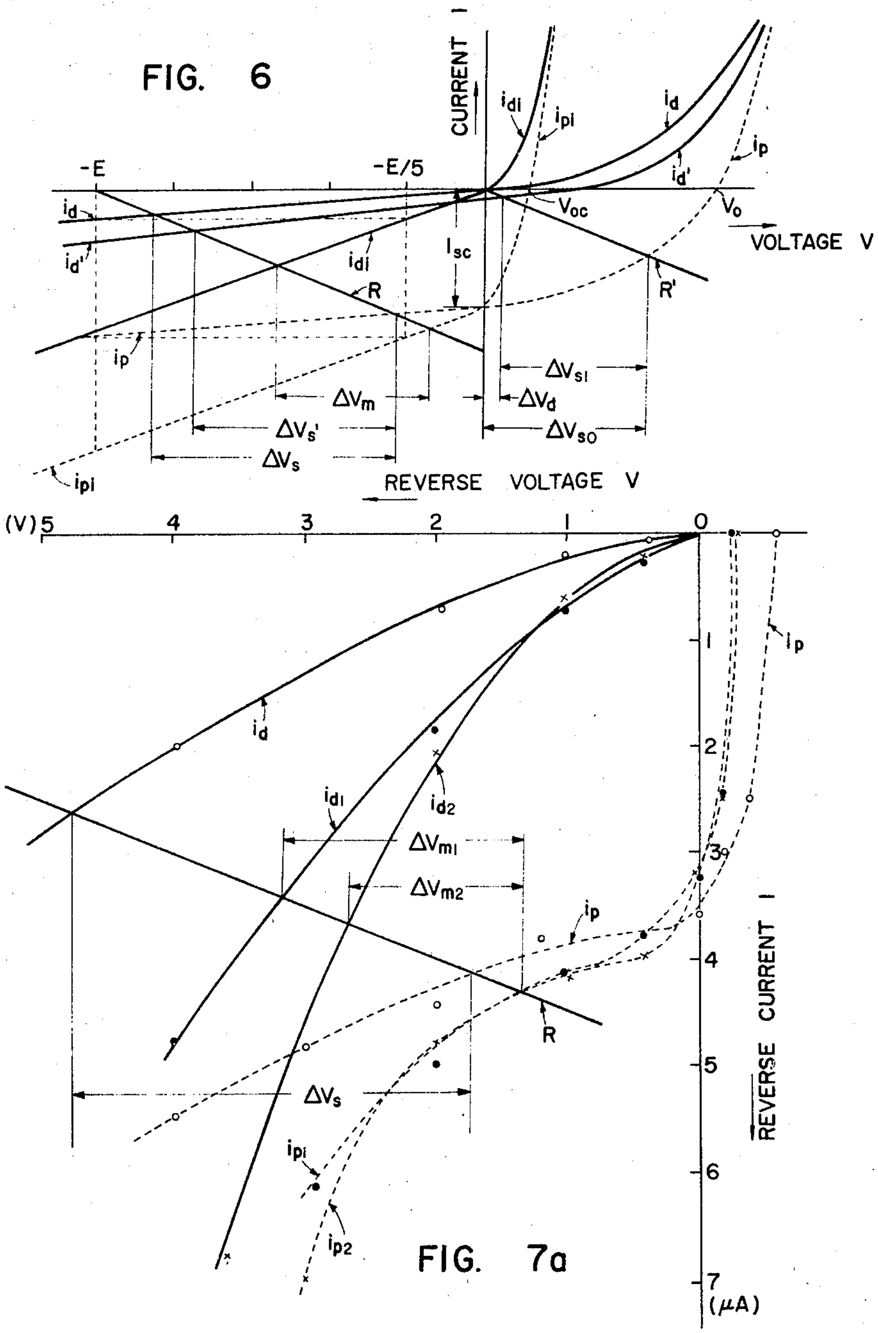
FIGURE 6 is a voltage vs. current characteristic diagram showing the function of the device of FIGURE 5.
Figures 7B, 8, 9A, 9B, 10:
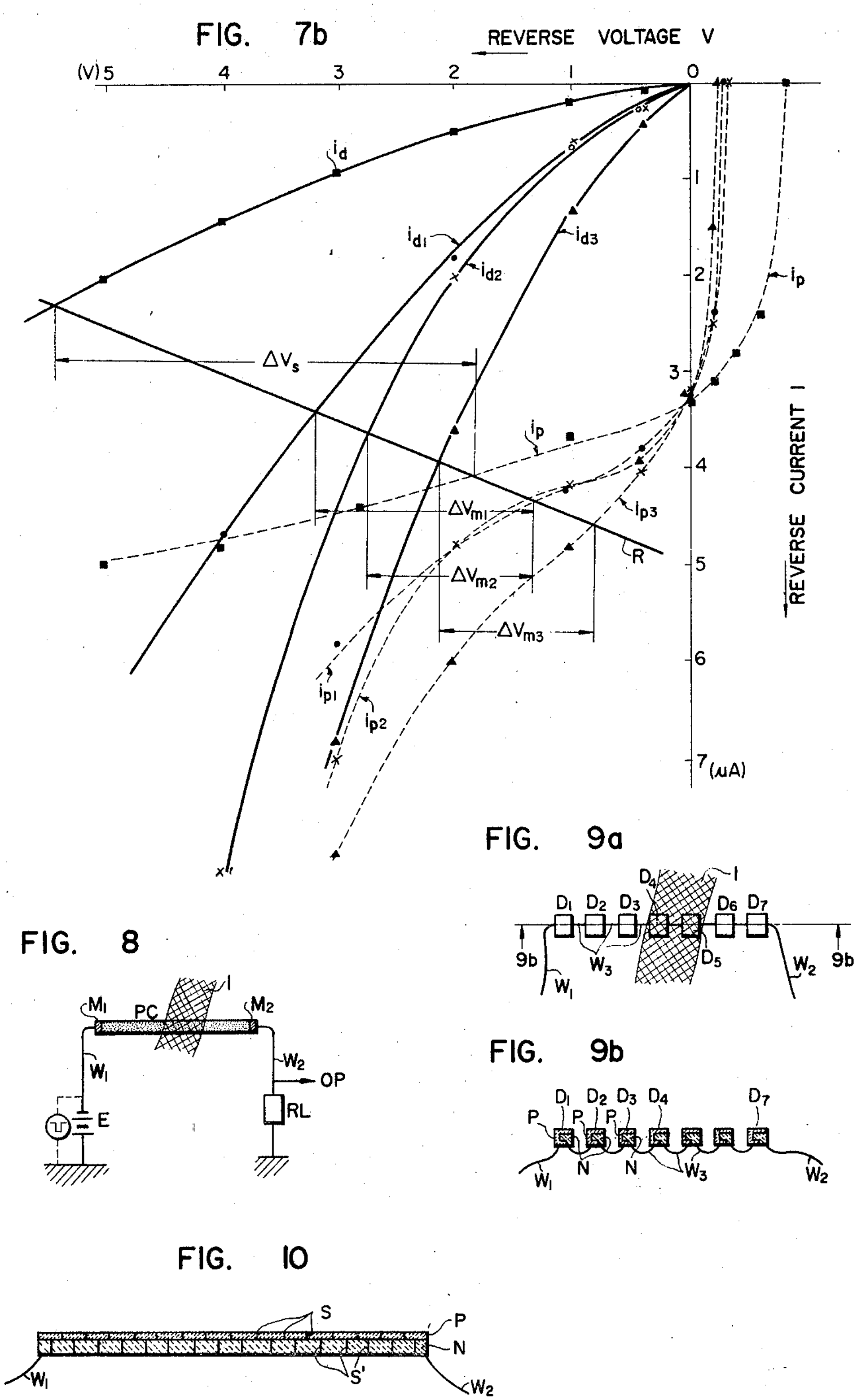

FIGURES 7*a* and 7*b* are voltage vs. current characteristic diagrams of the pattern detecting devices of the present invention;

FIGURE 8 is a circuit diagram showing an example of photo-electric conversion elements used in conventional pattern detecting devices;

FIGURES 9 to 11 inclusive are structural diagrams showing various embodiments of the photo-electric elements used in the pattern detecting device of the present invention; and FIGURES 12 to 22 inclusive are structural diagrams showing various types of the pattern detecting device of the present invention.

Figures 1, 2A, 2B, 3A, 3B, 4, 5:
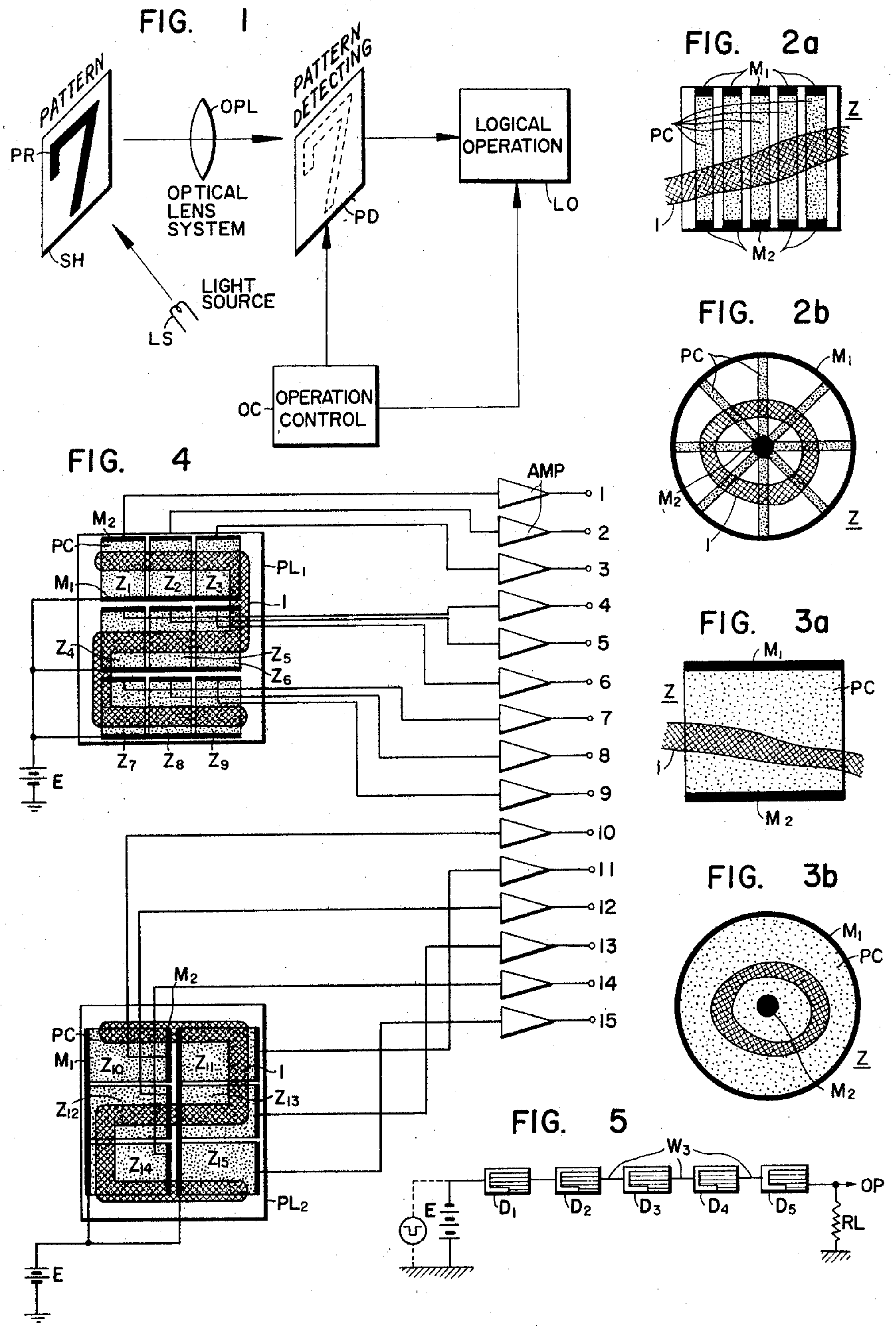
FIGURE 4 is a circuit diagram of a certain type of pattern detecting device.
FIGURE 5 is a circuit diagram showing the principle of the pattern detecting device according to the present invention.

First of all, the principle of the character reading apparatus will be briefly explained to provide a basis for understanding the present invention. FIGURE 1 schematically illustrates one example of the functional aspects of a character reading apparatus. An optical pattern PR printed on a base sheet SH is illuminated by a light source LS. A reflected light from the pattern PR is focused by an optical lens system OPL and is projected onto a pattern detecting device PD. The features of the pattern are detected by the pattern detecting device PD under the control of an operation controlling device OC and are converted into electrical signals. The electrical signals from the pattern detecting device PD are supplied to a logical operation stage LO, wherein the electrical signals are logically operated upon under the control of the operation controlling device OC, and the nature of the pattern PR is read out. The device OC and stage LO are of well-known configuration, and may, for example, take the form disclosed in U.S. Patent 3,200,373.

FIGURES 2*a* and 2*b* illustrate two examples of partial proto-sensitive zones Z forming a portion of an image projecting plane of the pattern detecting device PD in FIGURE 1. As shown in FIGURE 2*a*, a plurality of photo-sensitive bodies PC comprising, for an example, photo-conductive material, are arranged in parallel relationship on the surface of the zone Z, and electrodes $M_1$ and $M_2$ are fixed at the ends of the photo-sensitive bodies PC. The photo-electric conversion element, as shown in these figures, is hereinafter called "plural-detector type element." All the detectors are commonly connected to an electrical source through a load resistance (not shown). When an optical dark image I is projected onto the zone crossing over all the detectors, such dark image causes each photo-conductive element PC to change in impedance to a high-resistance state, with the result that a voltage variation is generated across the load resistance. This voltage variation is used as an electrical signal which is logically detected by the logical operating stage LO in FIGURE 1. The element shown in FIGURE 2*a* is not responsive at the time when the dark image I covers only a part of the photo-sensitive bodies, because the portion of the bodies on which no dark image is projected is still in the low-resistance state preserving a low-resistance connection between M1 and M2. Accordingly, such element can detect only the image I crossing over all of the photo-sensitive bodies in the horizontal direction. FIGURE 2*b* illustrates a modification of the plural detector type element shown in FIGURE 2*a*, in which the photo-sensitive bodies PC are arranged in the radial direction. Thus a circular dark image I can be detected by this element.

FIGURES 3*a* and 3*b* illustrate the so-called single-detector type element. FIGURE 3*a* corresponds to FIGURE 2*a*, and FIGURE 3*b* corresponds to FIGURE 2*b*. The function of the elements shown in these figures is similar to that of the elements shown in FIGURES 2*a* and 2*b*. According to the elements shown in FIGURES 2*a* and 2*b*, however, it is possible to use so-called threshold logic. That is to say, the element of FIGURE 2*a* consists of five bodies, and, if a threshold value of 4/5 is adopted for detection of an output, the dark image which crosses only four bodies of the five-body element can be detected. Consequently, with this latter arrangement it is possible to detect an image which is broken at a part thereof.

FIGURE 4 illustrates a more detailed circuit arrangement of the pattern detecting device shown in FIGURES 1 and 2. In this case, a system using the single-detector type elements is illustrated. Namely, two pattern detecting panels $PL_1$ and $PL_2$ are provided for detecting the line elements of a character image I, each of which comprises a plurality of partial photo-sensitive zones $Z_1$ to $Z_9$, or $Z_{10}$ to $Z_{15}$ consisting of photo-electric conversion elements of the single-detector type. The panel $PL_1$ is provided for detecting the pattern line elements in the horizontal direction, and the panel $PL_2$ is provided for detecting the pattern line elements in the vertical direction. The electrodes $M_1$ fixed at one end of the respective photo-electric conversion elements are commonly connected to an electrical source E, and each of electrodes $M_2$ at another end of the respective elements is connected to an individual signal amplifier AMP. The references 1 to 15 inclusive affixed to the output terminals of the respective amplifiers correspond to the numbers of the zones $Z_1$ to $Z_{15}$. In the case where an optical dark image I representing the numeral 2 is projected onto both panels $PL_1$ and $PL_2$, all of the zones $Z_1$ to $Z_9$ of the panel $PL_1$ and the zones $Z_1$ and $Z_{14}$ of the panel $PL_2$ are changed to the high-resistance state, but the zones $Z_{10}$, $Z_{12}$, $Z_{13}$ and $Z_{15}$ remain in the low-resistance state since they are only partially traversed. The amplifiers AMP are constituted so as to generate an electrical signal 1 when the zone connected with each such amplifier is in the high-resistance state, and to generate an electrical signal "O" when such zone is in the low-resistance state. Consequently, it is possible to read out the numeral 2 if the logic "and" value of the electrical signals from the terminals 1 to 9 inclusive and 11 and 14 is produced at the output of amplifiers AMP.

Though only one example for detecting the numeral 2 is explained in the above description, it will be apparent that various kinds of characters can be read out by such a pattern detecting device. The object of the present invention is not to provide a pattern detecting system such as illustrated in FIGURES 1 to 4 inclusive, but is to provide a pattern detecting conversion element of novel construction. Accordingly, a more detailed explanation of such pattern detecting system is omitted herein.

Referring now to FIGURE 5, the principle of the pattern detecting device according to the present invention will be explained. Photo-sensitive bodies $D_1$, $D_2$, $D_3$, $D_4$ and $D_5$, such as solar batteries, photo-diodes or phototransistors, are connected to each other by conductors $W_3$ in series relation. A direct current reverse bias voltage source E (or an electric pulse source shown in dotted line) is connected between both ends of the serially connected photo-sensitive bodies $D_1$ to $D_5$ through a load resistor $R_L$. An output terminal OP is connected to the junction point of the body $D_5$ and the resistor $R_L$. The voltage variation across the resistor $R_L$, which is generated by such a function of the bodies $D_1$ to $D_5$ as mentioned hereinafter in detail, is derived from the output terminal OP. These serially connected photo-sensitive bodies $D_1$ to $D_5$ correspond to the photo-electric conversion element PC shown in FIGURES 2 and 3.

FIGURE 6 illustrates a voltage vs. current characteristic, for an experimental model of the photo-sensitive bodies shown in FIGURE 5. A curve $i_{d1}$ shows the dark-current of a single body. As shown in the figure, such dark-current tends to increase in the negative direction with the increase of the reverse bias-voltage. A curve $i_{p1}$ shows the light-current of such body, which exhibits such a characteristic that a certain value of short circuit current $I_{sc}$ is added to the dark-current $i_{d1}$. The photo-electric conversion elements according to the present invention consist of a plurality of such photo-sensitive bodies having the same voltage vs. current characteristic, which are connected in series as shown in FIGURE 5. When the reverse bias voltage E which is the same value as that of the voltage considered in the case of a single solar battery, is applied, such reverse voltage E is equally divided into each body, and then the voltage applied to each body becomes ⅕ of E (in this case, it is considered that the number of the bodies is five). Accordingly, the voltage vs. current characteristic of the photo-electric conversion element can be shown with the curves $i_d$ (dark-current) and $i_p$ (light-current). Since the photo-sensitive bodies $D_1$ to $D_5$ are connected to the electrical source E through the resistor $R_L$ as shown in FIGURE 5, a load-line R can be drawn as shown in FIGURE 6. Accordingly, the voltage difference between the voltage across the resistor $R_L$ at the time when a light is projected to the bodies, and the voltage across the resistor $R_L$ at the time when no light is projected to the bodies, can be shown with the references $\Delta V_m$ (in case of a single body) and $\Delta V_s$ (in case of five bodies). It will be apparent from FIGURE 6 that the voltage difference $\Delta V_s$ is larger than the voltage difference $\Delta V_m$, and that the sensitivity of the photo-electric conversion element comprising a plurality of photo-sensitive bodies can be remarkably improved in comparison with that of the case of a single photo-sensitive body.

On the other hand, the crossing point $V_{oc}$ of the curve $i_{p1}$ with the horizontal axis of FIGURE 6 shows the open circuit voltage in case of the single photo-sensitive body at the time when a light is projected thereto. This open-circuit voltage increases with the number of the photo-sensitive bodies connected to each other in series. The open-circuit voltage in case of five bodies is shown by the reference $V_o$ in FIGURE 6. Consequently, it is possible to derive a very large output signal $\Delta V_{so}$ from the terminal OP even though no reverse bias voltage is applied. The reference R′ in FIGURE 6 shows a load line at the open circuit.

Though the above description refers only to a case where all, or none, of the photo-sensitive bodies are exposed to the light, it is of course possible to detect the existence of the dark image even if only a part of the photo-sensitive bodies is covered by such dark image. In this case, the voltage vs. current characteristic more or less differs from the case as mentioned above. If, for example, a case is considered wherein a shadow is projected onto three bodies $D_2$, $D_3$ and $D_4$, and the other bodies $D_1$ and $D_2$ are illuminated, it should be apparent that the bodies $D_1$ and $D_5$ exposed to the light will operate along the light-current curve $i_{p1}$ within the range of positive voltage in FIGURE 6, and that the bodies $D_2$ to $D_4$ not exposed to the light will operate along the dark-current curve $i_{d1}$ within the range of negative voltage. In this case, however, the same current must flow through all the bodies because these bodies are connected serially. Accordingly, the total characteristic of the photo-electric conversion element can be expressed as shown by the curve $i_{d'}$ in FIGURE 6. This curve can be considered as a dark-current curve of three bodies $D_2$ to $D_4$ serially connected shifted in the positive direction by the value corresponding to the sum of photo-electromotive forces of the two bodies $D_1$ and $D_5$. Since the characteristic curve at the time when all bodies are exposed to the light is shown with the curve $i_p$ as mentioned above, the voltage difference in the case where the reverse bias voltage E is applied through the resistor $R_L$ becomes $\Delta V_{s'}$, which has a value near the voltage difference $\Delta V_s$ at the time when all the bodies are covered by the shadow.

As is apparent from the above-mentioned explanation, the photo-electric conversion elements can generate an output which is slightly different from the case where all of the photo-sensitive bodies are covered by a shadow, even if only a part of them is covered. Thus, such photo-electric conversion elements can be used for very high-sensitive, dark image detecting elements. In this case, if the reverse bias voltage is selected at zero, namely, if only the photo-electromotive force is derived at the output, the light-voltage of the element becomes $\Delta V_{s1'}$ and the dark-voltage becomes $\Delta V_{d'}$, as shown in FIGURE 6, and then an improved ratio of signal vs. noise (S/N) can be obtained.

FIGURE 7 shows an experimental characteristic diagram wherein use is made of solar batteries as detecting elements. For the purpose of the experiments, the ordinary PonN-type solar batteries (size: 1 mm. x 4 mm.) are used for specimens, and light energy of 200 luxes from a tungsten lamp is used for illuminating the solar batteries. FIGURE 7*a* shows the dark-current $i_d$ of the photo-electric conversion element comprising two solar batteries, each having the dark-current $i_{d1}$ and the light current $i_{p1}$, or the dark-current $i_{d2}$ and the light-current $i_{p2}$. The dark-current $i_{d1}$ or $i_{d2}$ of the solar batteries does not linearly increase in the negative direction with the increase of the reverse bias voltage V but rather increases exponentially. Accordingly, it is possible to more greatly reduce the dark-current in comparison with the case of FIGURE 6. FIGURE 7*a* further shows the output voltage variations in case of using a load resistor of 2 meg-ohms and a reverse bias voltage of 10 volts. As is apparent from the figure, the output voltage variations in case of a single solar battery are relatively small, as shown with the references $\Delta V_{m1}$ and $\Delta V_{m2}$, but the voltage variation in case of the element comprising two solar batteries serially connected remarkably increases to $\Delta V_s$, as shown in the figure. Thus, it is seen to largely improve the sensitivity of the elements.

FIGURE 7*b* shows the dark-current $i_d$ and the light-current $i_p$ of the photo-electric conversion element comprising three solar batteries, each having a dark-current $i_{d1}$, $i_{d2}$ or $i_{d3}$ and a light-current $i_{p1}$, $i_{p2}$ or $i_{p3}$. The output voltage variation of such element at the time when a reverse bias voltage of 10 volts is applied through a load resistor of 2 meg-ohms, similarly to the case of FIGURE 7*a*, increases up to a value $\Delta V_s$ which is very much larger than the voltage variations $\Delta V_{m1}$, $\Delta V_{m2}$ or $\Delta V_{m3}$ in case of a single solar battery. From such characteristics, it will be apparent that the sensitivity of the photo-electric element can be improved by using an increased number of solar batteries connected in series.

FIGURE 8 illustrates one example of a photo-electric conversion element which may be utilized according to the present invention. In this case, a long and narrow photo-conductive body PC is used, and such body PC is provided with two electrodes $M_1$ and $M_2$ arranged at respective ends thereof. A conductor $W_1$ is connected from the electrode $M_1$ to an electric source E, and a conductor $W_2$ is connected from the electrode $M_2$ to a load resistor $R_L$ having an output terminal OP, whereby an electric voltage E is applied to the photo-conductive body PC through the resistor $R_L$. When a dark-image I covers a part of the body PC, the impedance of the part of body PC covered by the dark-image I becomes large, and an electric current flow through the circuit is caused to decrease. Consequently, a voltage variation is generated across the load resistor $R_L$, and such variation is detected as an electrical signal from the output terminal OP. Thus, the existence of the dark-image I can be recognized from such electrical signal.

As mentioned above, it is possible to detect patterns by using photo-conductive bodies consisting of, for example, cadmium-sulfide and cadmium-selenide, which are relatively cheap in cost. Such photo-conductive bodies have the advantage that the sensitivity to visible light is very high, but also have the disadvantage that the response speed to light is relatively low. Accordingly, even though the bodies comprising cadmium-sulfide or cadmium-selenide are used, the repeated pattern-detecting frequency of the element is only several hundred cycles per second at the maximum, and such frequency moreover is reduced at times of low illumination. Contrary to this, photo-sensitive bodies comprising solar batteries, photo-diodes or photo-transistors have a response speed higher than 10 kc. which is very suitable for pattern detecting devices for high speed electronic computers. Though such solar batteries, photo-diodes and photo-transistors have the disadvantage that the dark-current thereof is relatively large, this disadvantage can be effectively eliminated by connecting a plurality of bodies in series, as described above.

FIGURES 9*a* and 9*b* illustrate one example of the photo-electric conversion elements according to the present invention, in which seven photo-sensitive bodies $D_1$ to $D_7$ are connected in series by conductors $W_3$. A reverse bias-voltage is applied to the bodies through a load resistor (not shown) and conductors $W_1$ and $W_2$. FIGURE 9*b* is a sectional view for illustrating the structure of each photo-sensitive body. The conversion elements consist of P-type semiconductor layers P (hereinafter called "P-layers") and N-type semiconductor layers N (hereinafter called "N-layers"). The conductor $W_1$ is connected to the P-layer P of the body $D_1$, and the conductor $W_2$ is connected to the N-layer N of the body $D_7$. The N-layer N of each of the bodies $D_1$ to $D_6$ is connected to the P-layer P of the succeeding body by the conductors $W_3$. When a dark-image I covers one or more of the bodies $D_1$ to $D_7$, the element can operate as mentioned above referring to FIGURE 6, and the voltage variation across the load resistor is detected as an output signal.

FIGURE 10 illustrates one embodiment of the photo-electric conversion elements, in which a plurality of photo-sensitive bodies are assembled integrally. In this embodiment, a P-type layer P is formed on one surface of a rodlike N-type semiconductor element N. The P-layer P is separated into a plurality of partial bodies with insulating layers S therebetween, and the N-type semiconductor elements N are also separated into a plurality of partial bodies with insulating layers S' therebetween which are also positioned between the adjoining insulating layers S of the P-type layer P. Consequently, this photo-electric conversion element consists of a plurality of partial photo-sensitive bodies which are connected in series by the P-layers and N-layers themselves. In this case, however, the P-N junctions biased in the forward direction and the P-N junctions biased in the reverse direction are arranged alternately. Since the impedance of the P-N junctions biased in the forward direction is maintained at a very small value, such junctions can operate as electrical conductors. Accordingly, the function of the element shown in FIGURE 10 is similar to that of the element shown in FIGURE 9; and, moreover, this element is characterized in that it is possible to simplify the structure to a greater extent in comparison with the case where the respective bodies are connected with wire conductors. Furthermore, the electric source can be applied to either the conductor $W_1$ or the conductor $W_2$, and also an alternating voltage can be used for the electric source. Consequently, the external appearance of the element shown in FIGURE 10 is substantially similar to the element comprising the photo-conductive body PC, as shown in FIGURE 8.

Figure 11A:
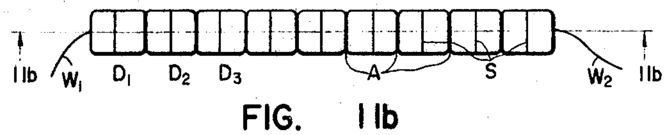
Figure 11B:
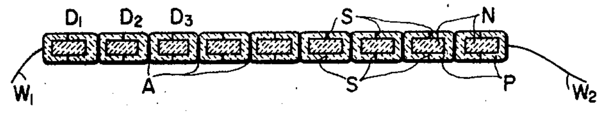
Figure 11C:
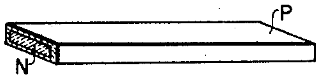

FIGURES 11*a* and 11*b* illustrate another embodiment of the photo-electric elements according to the present invention, in which a plurality of photo-sensitive bodies $D_1$, $D_2$, $D_3$ . . . are connected to each other with a suitable, conductive bonding material A, such as metallic solder and silver paste, so as to form a continuous body. Each body $D_1$, $D_2$, $D_3$ . . . consists of a piece of N-type semiconductor material N, on both surfaces of which a P-type layer P of a thickness of about several microns is formed so as to produce a P-N junction therebetween. The P-type layer P of each body is divided into two portions in the longitudinal direction of the element with an insulating layer S extending in transverse direction. These respective bodies $D_1$, $D_2$, $D_3$ . . . can be obtained by cutting a long thin rod having a core of N-type material and an outer layer of P-type material, as shown in FIGURE 11*c*. Such rod is prepared by forming a P-type layer P on all surfaces of a long and thin, N-type silicon rod.

Figure 12A:
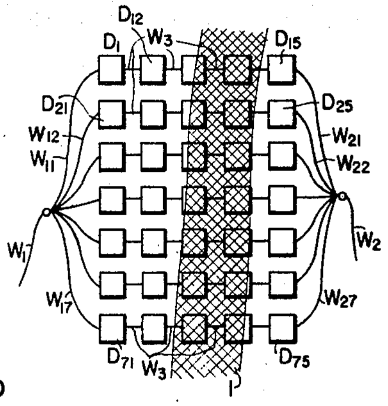

FIGURES 12*a* through 12*d* illustrate several embodiments of the pattern detecting device according to the present invention which comprise a plurality of the photo-electric conversion elements which consist of any of the structures shown in FIGURES 9 to 11 inclusive. In the embodiment of FIGURE 12*a*, a plurality of photo-electric conversion elements of the type shown in FIGURE 9 are arranged in parallel in the vertical direction so as to form a flat photo-sensitive plane similar to the plural detector type element shown in FIGURE 2*a*. The respective elements are connected in parallel by conductors $W_{11}$ to $W_{17}$ and $W_{21}$ to $W_{27}$. Consequently, these elements can operate as a single body similar to the partial photo-sensitive zone Z of FIGURE 2*a*. Thus, when a dark-image I is projected onto the elements, as shown in FIGURE 12*a*, so as to cross over the elements in the vertical direction, the existence of such image I can be detected.

Figure 12B:
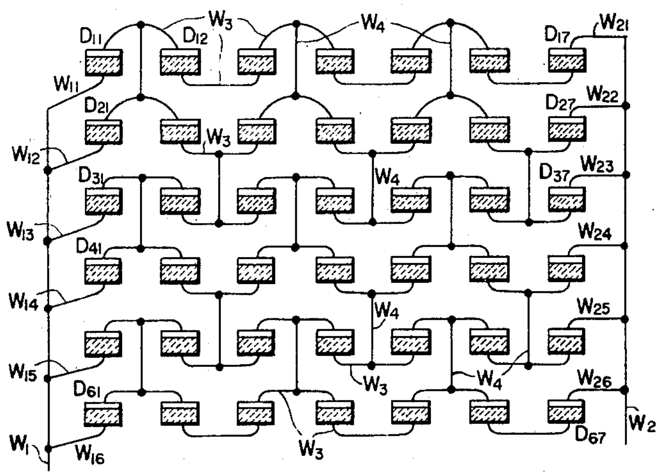
Figure 12C:
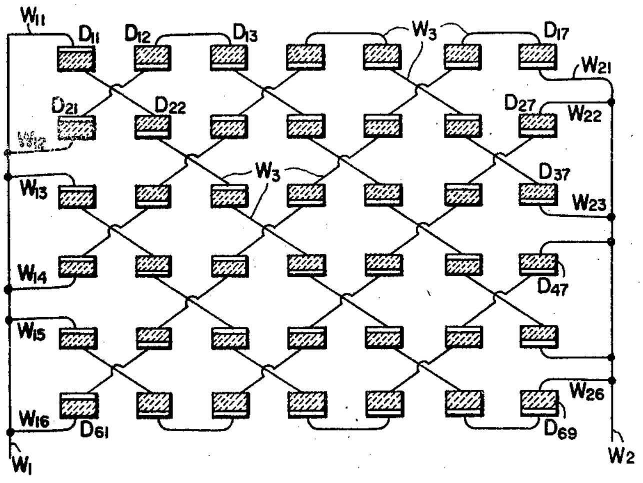

FIGURES 12*b* and 12*c* illustrate other embodiments, in which different connections than those utilized in the embodiment of FIGURE 12*a* are applied. In these figures, the shaded portion of each body D represents the N-layer material, and the unshaded portion represents the P-layer material. In FIGURE 12*b* each element arranged on the lines in the horizontal direction comprises a plurality of photo-sensitive bodies connected by conductors $W_3$ so as to provide an alternate arrangement of the forwardly biased bodies and the reversely biased bodies. Moreover, the conductors $W_3$ adjoining each other are alternately connected with conductors $W_4$, as shown in the figure. The bodies $D_{11}$, $D_{21}$ . . . $D_{61}$ or $D_{17}$, $D_{27}$ . . . $D_{67}$ positioned at opposite ends of each line in the vertical direction are connected in parallel with conductors $W_{11}$, $W_{12}$ . . . and $W_{17}$, or $W_{21}$, $W_{23}$ . . . and $W_{27}$, and are moreover connected to a common conductor $W_1$ or $W_2$. Though the distances between the respective bodies are exaggerated in the figure, this is done to simplify the illustration of the arrangement of the bodies. In practice, it will be apparent that the bodies are arranged at more suitable distances according to the features of the pattern to be detected. Besides, in the general type of solar batteries, electrodes to be connected to the P-layer or N-layer are provided on the same surface, as shown in FIGURE 9*b*, and then the connections with the conductors $W_3$ and $W_4$ can be achieved at the back side of the plane for mounting the photo-sensitive bodies.

The pattern detecting device shown in FIGURE 12*b* can detect the existence of the dark-image having a width larger than the distance between two photo-sensitive bodies D adjoining one another in the horizontal direction. When a dark-image of a width smaller than this distance is projected, the detection of the existence of such image is possible only when that image is accidentally positioned on the reversely biased bodies. Since the forwardly biased bodies always exhibit a low impedance even though the dark-image covers them, it is impossible to detect the image when it is accidentally positioned on these forwardly biased bodies alone. Accordingly, the device of FIGURE 12*b* can detect the dark-image having a width larger than the distance between two photo-sensitive bodies adjoining one another in the horizontal direction, and extending in the vertical direction. Moreover, this device can also detect a dark-image on the diagonal line as long as such image crosses over all the horizontal lines of photo-sensitive bodies and covers at least two bodies on each of the respective lines. The polarity of the bias voltage and the position of the image in the horizontal direction have no effect on detection of such an image. However, when only the photo-electro-motive forces of the photo-sensitive bodies are used for the output signals, the arrangement of FIGURE 8*c* is not applicable. In such case, it is necessary to use an arrangement wherein all the bodies are biased in the same direction.

FIGURE 12*c* illustrates another arrangement of the photo-sensitive bodies in accordance with the present invention. In this case, the bodies positioned in the direction of the diagonal line are serially connected by the conductors $W_3$. With respect to the alternate connection of the forward biased bodies and the reversely biased bodies, this embodiment is the same as FIGURE 12*b*. According to this embodiment, it is possible to detect any dark-image extending in the vertical direction as long as such image has a width greater than the width of two bodies adjoining in the horizontal direction, but the detection of the image extending in the direction of the diagonal line is limited to situations where the image covers at least three bodies. The reason for this is that, if the width of the image is smaller than the distance of three bodies adjoining in the horizontal direction, there is a possibility that the image will cover only the forwardly biased bodies with respect to the groups of bodies which are connected by the same conductors $W_3$.

Figure 12D:
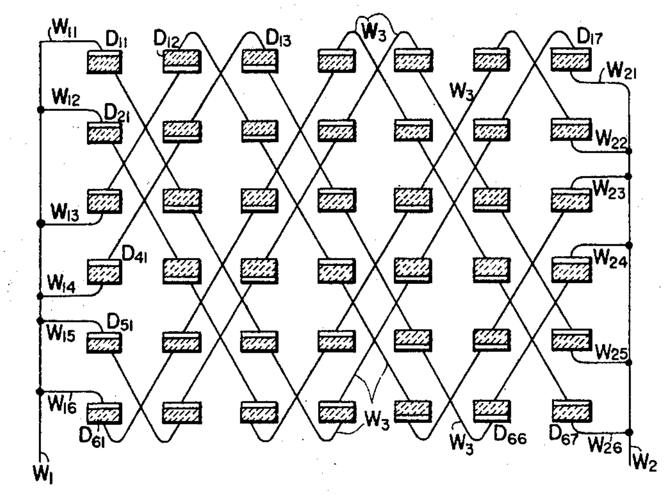

FIGURE 12*d* illustrates still another arrangement of the photosensitive bodies, in which the respective bodies are connected by the conductors $W_3$ on every other line in the oblique direction. In this case, the dark-image to be detected is also required to have a width which covers two photo-sensitive bodies in the horizontal direction and three bodies in the oblique direction.

Figure 13:
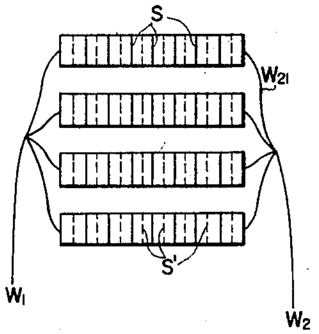

FIGURE 13 illustrates one embodiment of the pattern detecting device of the present invention using the photo-electric elements shown in FIGURE 10. The function of this embodiment is similar to that of the embodiment shown in FIGURE 12*a*.

Figure 14:
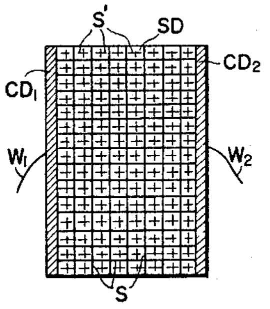

FIGURE 14 illustrates another embodiment of the present invention. In this embodiment, the pattern detecting device is provided with a flat N-type semiconductor wafer, on which a P-type layer is formed. The P-type layer is divided into numerous partial portions by insulating layers S extending in the vertical and horizontal directions, as shown in the figure. On the other hand, the N-type layer is also divided into numerous partial portions by insulating layers S′ positioned alternately with said insulating layers S and extending in the vertical and horizontal directions. The function of this embodiment is more similar to that of the device shown in FIGURE 2*a*. These insulating layers S and S′ can be prepared so as to extend in the oblique direction if desired. In FIGURE 14, electrodes $CD_1$ and $CD_2$ are provided for applying the bias voltage. Both embodiments shown in FIGURES 13 and 14 can be used with any polarity of bias voltage or with an alternating bias voltage.

Figure 15A:
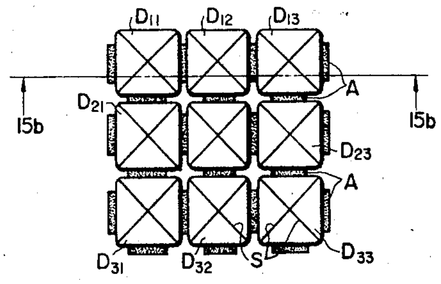
Figure 15B:
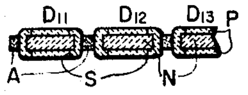

FIGURES 15*a* and 15*b* illustrate a modification of the pattern detecting device shown in FIGURE 11, in which a plurality of pieces D, comprising an N-type semiconductor N and a P-type layer P formed thereon, are used for photo-sensitive bodies. The P-type layer P of each piece D is divided into four portions by two insulating layers S extending on all surfaces of the piece in the diagonal directions, and each piece is connected with the adjoining pieces by electrically conductive bonding material A so as to form an optical image projecting plane.

Figure 16B:
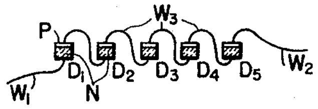
Figures 16A, 17:
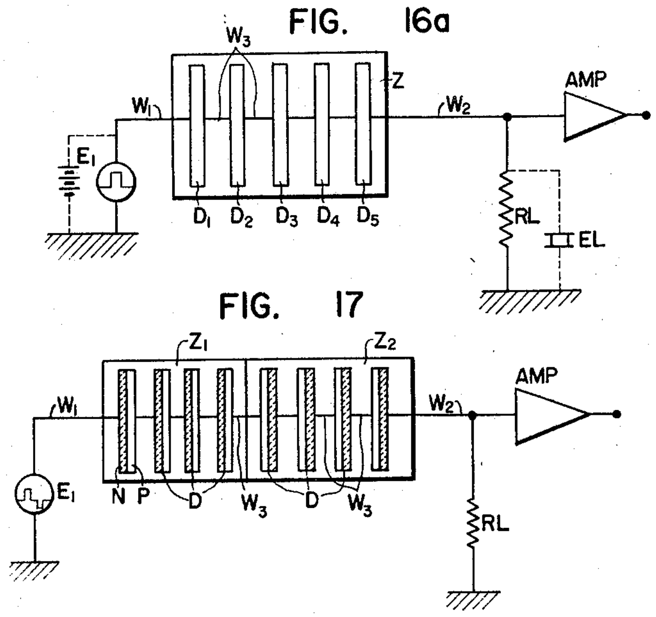

FIGURES 16*a* and 16*b* illustrate an embodiment of the pattern detecting device which utilizes a modified structure of the photosensitive bodies. In this case, each photosensitive body consists of a long and narrow rodlike element, as shown by the references $D_1$ to $D_5$. The same reference designations in this figure represent similar elements provided in the other figures. FIGURE 16*b* illustrates the electrical connection of the photo-sensitive bodies in the same way as those in FIGURE 12. The function of this embodiment is similar to that of the embodiments in FIGURES 12*a* and 13. Namely, when a dark image extending in the vertical direction is projected, and covers at least one of these bodies $D_1$ to $D_2$, the body covered by the image is changed to its high conductive state, and then an output signal is derived as a voltage variation across the resistor $R_L$. If an electroluminescent device EL is connected across the resistor $R_L$, such device is caused to glow due to the voltage drop across the resistor $R_L$ when all the photo-sensitive bodies are illuminated, but it is caused to stop glowing when the dark image is projected onto at least one of the bodies.

FIGURE 17 illustrates another embodiment of the pattern detecting device, in which eight photo-sensitive bodies are arranged within two partial zones $Z_1$ and $Z_2$. Four bodies in the zone $Z_1$ are biased oppositely to other four bodies in the zone $Z_2$. Namely, when a positive bias voltage is applied, all the bodies in the zone $Z_1$ are reversely biased but the bodies in the zone $Z_2$ are forwardly biased. Contrary to this, when a negative bias voltage is applied, the bodies in the zone $Z_1$ are forwardly biased but the bodies in the zone $Z_2$ are reversely biased. Since the photo-sensitive bodies are responsive to the light only in the case when the reverse bias voltage is applied thereto, the zone $Z_1$ or $Z_2$ is not responsive to the light when the forward bias voltage is applied to the photo-sensitive bodies. Consequently, it is possible to select the zones by changing the polarity of the bias voltage, according to the embodiment shown in FIGURE 17.

Figure 18A:
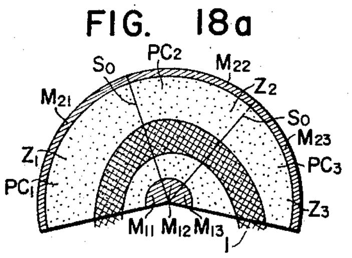
Figure 18B:
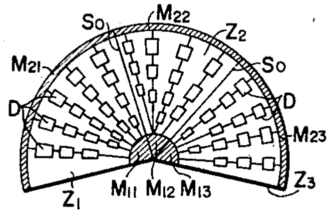
Figure 18C:
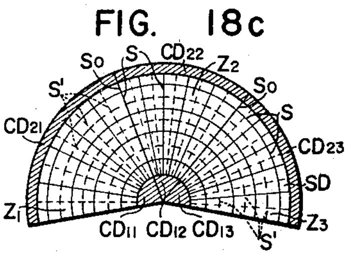

Finally, various other kinds of pattern detecting devices of the present invention will be illustrated. FIGURE 18*a* shows a modification of the pattern detecting device of the single sonde type element shown in FIGURE 3*b*, in which the same references as those in FIGURE 3*b* represent similar elements in FIGURE 18*a*. In this modification, the photo-sensitive body PC is divided into three portions $PC_1$, $PC_2$ and $PC_3$ by insulating layers $S_O$. According to this device, it is possible to detect an image I extending in the circular direction. Illustrated in FIGURES 18*b* and 18*c* are pattern detecting devices according to the present invention, which are shown in comparison with the device of FIGURE 3*a*. The device of FIGURE 18*b* corresponds to the device of FIGURE 12*a*, and the device of FIGURE 18*c* corresponds to the device of FIGURE 14.

Figure 19A:
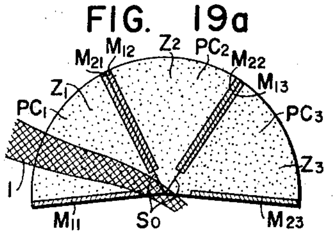
Figure 19B:
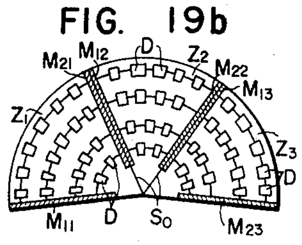
Figure 19C:
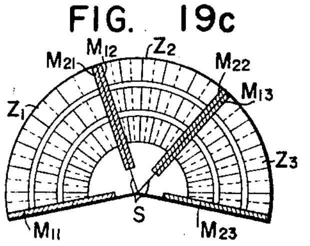
Figure 19D:
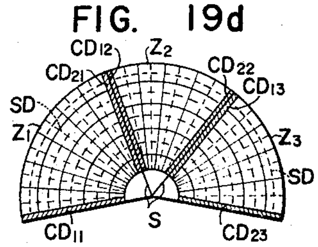

FIGURES 19*a* through 19*d* illustrate another kind of pattern detecting device. FIGURE 19*a* shows the conventional type shown in FIGURE 3*a*, which is for comparing with the devices of the present invention. Illustrated in FIGURES 19*b*, 19*c* and 19*d* are the pattern detecting devices according to the present invention. All the devices in FIGURES 19*a* to 19*d* inclusive are for detecting an image extending in the radial direction, and every device is divided into three partial zones $Z_1$ to $Z_3$ similarly to the devices shown in FIGURE 18. The device shown in FIGURE 19*b* utilizes the elements shown in FIGURE 12*a*, and the device of FIGURE 19*c* utilizes the device of FIGURE 13, and the device of FIGURE 19*d* utilizes the device of FIGURE 14.

Figures 20A, 20B:
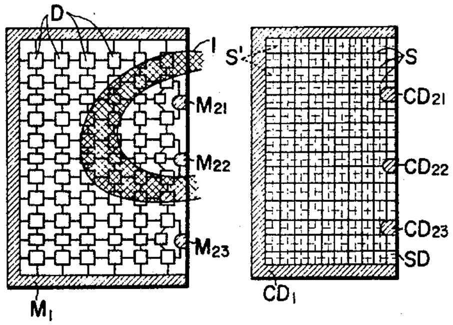
Figure 20C:
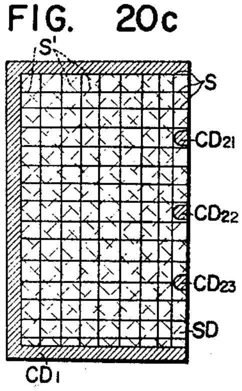

FIGURES 20*a* through 20*c* illustrate other modifications of the pattern detecting devices according to the present invention. These modifications are for detecting an image I convexed to the left, as shown in FIGURE 20*a*. As shown in the figures, every device has a common electrode $M_1$ or $CD_1$ and three opposite electrodes $M_{21}$, $M_{22}$ and $M_{23}$, or $CD_{21}$, $CD_{22}$, $CD_{23}$, thereby the existence and position of the convexed image I can be selectively detected. The device shown in FIGURE 20*a* is a modification of the element of FIGURE 12*a*, and FIGURES 20*b* and 20*c* are modifications of the device of FIGURE 14.

Figure 21:
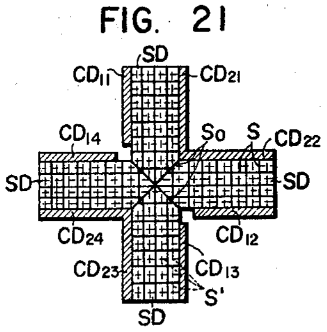

FIGURE 21 further illustrates another modification of the pattern detecting device of the present invention, in which four elements of the style shown in FIGURE 14 are arranged so as to form a cross. Accordingly, it is possible to detect a branched or bent pattern.

Figure 22A:
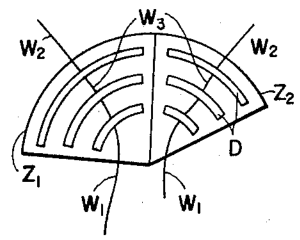
Figure 22B:
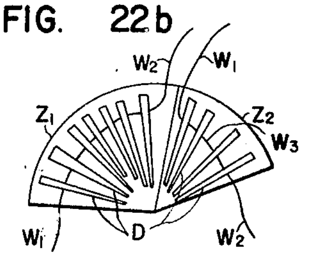

FIGURES 22*a* and 22*b* illustrate two embodiments of the invention utilizing the photo-electric conversion element shown in FIGURE 16. The device of FIGURE 22*a* corresponds to the device of FIGURE 19, and the device of FIGURE 22*b* corresponds to the device of FIGURE 18.

While I have shown and described a limited number of embodiments of the present invention, it will be understood that the same is not limited thereto but is susceptible of numerous changes and modifications as known to a person skilled in the art, and, I therefore do not wish to be limited to the details shown and described herein but intend to cover such changes and modifications as are within the scope of the appended claims.

I claim:

1. A pattern detecting device comprising:
at least one pair of electrodes;
at least one photo-electric conversion element connected between said electrodes, said photo-electric conversion element including a plurality of serially connected photo-sensitive bodies each having a PN junction, the conductivity of each of which varies in response to projection of a dark pattern thereon;
load means connected with one of said pair of electrodes; and
source means connected with the other one of said pair of electrodes for supplying a reverse bias voltage in series to at least two photo-sensitive bodies of said photo-electric conversion element and said load means, whereby the provision of the dark pattern on any one of the photo-sensitive bodies may be detected by the load means.

2. A pattern detecting device according to claim 1, in which each of said photo-sensitive bodies consists of a long and narrow rodlike element.

3. A pattern detecting device according to claim 1, in which said photo-electric conversion element comprises a semiconductor substrate having one conductivity-type and a semiconductor layer of the opposite conductivity-type formed on a surface of said substrate, said semiconductor substrate having separating members subdividing the substrate into a plurality of sections, said opposite conductivity-type layer having separating members subdividing the semiconductor layer into a plurality of sections, each of the sections of the semiconductor layer being positioned to bridge over two adjacent sections of said semiconductor substrate.

4. A pattern detecting device comprising:
at least one pair of electrodes;
photo-electric conversion means including a plurality of photoelectric conversion elements each of which is connected in parallel between said pair of electrodes and is arranged in such a form that only a dark pattern of a predetermined shape may intersect thereacross when projected thereon, said photosensitive elements including a plurality of serially connected photosensitive bodies each having a PN junction and each being disposed to provide a photo-responsive surface, the conductivity of each of which varies in response to whether or not the dark pattern is projected thereon; and
load means connected between said pair of electrodes for detecting the change in the conductivity of said photo-electric conversion means as a voltage drop thereacross.

5. A pattern detecting device according to claim 4, in which at least one of said photo-sensitive bodies in a photo-electric conversion element is connected to at least one of the adjoining photo-sensitive bodies in another photo-electric conversion element.

6. A pattern detecting device according to claim 4, which further comprises source means connected between said load means and one of said pair of electrodes for supplying a reverse bias voltage to at least two photo-sensitive bodies for each of the respective photo-electric conversion elements and said load means.

7. A pattern detecting device according to claim 6, in which said photo-electric conversion element comprises a semiconductor substrate having one conductivity-type and a semiconductor layer of the opposite conductivity-type formed on a surface of said substrate, said semiconductor substrate having separating regions extending in a transverse direction so that the substrate is sectionalized into a plurality of sections, said opposite conductivity-type layer having separating regions extending in the transverse direction so that the semiconductor layer is sectionalized into a plurality of sections, and said sections of the semiconductor layer being positioned to bridge over two adjacent sections of said semiconductor substrate.

8. A pattern detecting device comprising:
at least one pair of electrodes;
photo-electric conversion means comprising at least one photoelectric conversion element connected between said electrodes, said photoelectric conversion element including a plurality of serially connected photosensitive bodies each of which comprises a semiconductor chip having one conductivity-type and a semiconductor layer of the opposite conductivity-type formed on surfaces of said chip, said opposite conductivity-type layer having separating regions;
load means connected with one of said pair of electrodes; and
source means connected with the other one of said pair of electrodes for supplying a reverse bias voltage in series to at least two photo-sensitive bodies of said photo-electric conversion element and said load means, whereby the provision of the dark pattern on any one of the photo-sensitive bodies may be detected by the load means.

9. A pattern detecting device according to claim 8, in which said photo-electric conversion means comprises a plurality of photo-electric conversion elements and at least one of the photo-sensitive bodies in a photo-electric conversion element is connected to at least one of the adjoining photo-sensitive bodies in another photo-electric conversion element.

10. A pattern detecting device comprising:
photo-electric conversion means including a semiconductor wafer having one conductivity-type and an opposite conductivity-type semiconductor layer formed on a surface of said wafer, said semiconductor wafer being sectionalized into a plurality of portions by a plurality of first insulating regions extending in two directions crossing each other, and said opposite conductivity layer being sectionalized into a plurality of portions by a plurality of second insulating regions which extend in two directions crossing each other and positioned alternately with said first insulating regions;
one pair of electrodes connected to opposite ends of said photoelectric conversion means;
load means connected with one electrode of said pair of electrodes for detecting a dark pattern projected on said photo-electric conversion element; and
source means connected with the other electrode of said pair of electrodes for supplying an electric power to said photo-electric conversion element and said load means.

11. A pattern detecting device according to claim 10, in which said second insulating regions are provided along lines intersecting said first insulating regions.

References Cited

UNITED STATES PATENTS

| | | | |
|---|---|---|---|
| 3,026,417 | 3/1962 | Tomlinson | 250—211 |
| 3,107,302 | 10/1963 | Coleman | 250—208 X |
| 3,160,854 | 12/1964 | Gregory | 340—146.3 |
| 3,210,548 | 10/1965 | Morrison | 250—211 |
| 3,244,889 | 4/1966 | Preston et al. | 250—211 |
| 3,370,986 | 2/1968 | Amsterdam et al. | 250—211 X |
| 3,344,278 | 9/1967 | Yanai | 250—211 |

WALTER STOLWEIN, Primary Examiner

U.S. Cl. X.R.

340—146.3